United States Patent
Leizerovich et al.

(10) Patent No.: US 9,629,182 B2
(45) Date of Patent: Apr. 18, 2017

(54) METHOD AND SYSTEM FOR MANAGING A WIRELESS NETWORK COMPRISING A DISTRIBUTED ANTENNA SYSTEM (DAS)

(75) Inventors: Hanan Leizerovich, Petach Tikva (IL); Mordechai Zussman, Tel-Aviv (IL); Mark Altshuler, Ganot Hadar (IL)

(73) Assignee: Alvarion Ltd., Tel Aviv (IL)

( * ) Notice: Subject to any disclaimer, the term of this patent is extended or adjusted under 35 U.S.C. 154(b) by 487 days.

(21) Appl. No.: 14/131,929

(22) PCT Filed: Jul. 5, 2012

(86) PCT No.: PCT/IL2012/000272
§ 371 (c)(1),
(2), (4) Date: Apr. 24, 2014

(87) PCT Pub. No.: WO2013/008228
PCT Pub. Date: Jan. 17, 2013

(65) Prior Publication Data
US 2014/0233548 A1    Aug. 21, 2014

(30) Foreign Application Priority Data

Jul. 10, 2011 (IL) .......................................... 214002

(51) Int. Cl.
*H04W 74/08* (2009.01)
*H04W 84/12* (2009.01)
*H04W 88/08* (2009.01)

(52) U.S. Cl.
CPC ....... *H04W 74/0816* (2013.01); *H04W 74/08* (2013.01); *H04W 84/12* (2013.01); *H04W 88/085* (2013.01)

(58) Field of Classification Search
None
See application file for complete search history.

(56) References Cited

U.S. PATENT DOCUMENTS

| 7,693,107 | B2 | 4/2010 | De Froment |
| 2002/0163933 | A1* | 11/2002 | Benveniste ............. H04L 47/10 370/465 |
| 2003/0050099 | A1 | 3/2003 | Izadpanah |
| 2004/0063455 | A1 | 4/2004 | Eran et al. |
| 2004/0100930 | A1 | 5/2004 | Shapira et al. |
| 2007/0076742 | A1 | 4/2007 | Du et al. |
| 2008/0192855 | A1 | 8/2008 | Shapira et al. |

(Continued)

*Primary Examiner* — Michael Thier
*Assistant Examiner* — Kent Krueger
(74) *Attorney, Agent, or Firm* — Eitan, Mehulal & Sadot

(57) ABSTRACT

A method and a system are provided for reducing collisions created between endpoints in a wireless local area network environment incorporated with a distributed antenna system (DAS), wherein the DAS comprises a plurality of station units (STUs) each adapted to communicate wirelessly with one or more wireless stations, and at least one access point unit (APU) connected to the plurality of STUs and adapted to communicate with a respective access point. The method comprises: at a first STU belonging to the plurality of STUs, receiving a first signal transmitted wirelessly; conveying the first signal towards the APU; and at the APU, adapting the conveyed signal to be transmitted to the access point associated with the APU, and in response to receiving the first signal, conveying a return signal towards at least two STUs belonging to the plurality of STUs.

2 Claims, 6 Drawing Sheets

(56) References Cited

U.S. PATENT DOCUMENTS

2008/0267142 A1 10/2008 Mushkin et al.
2010/0099451 A1* 4/2010 Saban .................... H04W 4/20
　　　　　　　　　　　　　　　　　　　　　　455/502

* cited by examiner

METHOD AND SYSTEM FOR MANAGING A WIRELESS NETWORK COMPRISING A DISTRIBUTED ANTENNA SYSTEM (DAS)

FIELD OF THE INVENTION

The present invention relates to Wireless Local Area networks (WLAN) located in indoor/urban area and incorporating distributed antenna system (DAS) technologies, and in particular, to a system, device and method for managing DAS in order to improve the quality of communications being exchanged therethrough.

BACKGROUND

Many wireless communication networks are based on a contention protocol similar to the Carrier Sense Multiple Access/Collision Avoidance (CSMA/CA) contention protocol. This protocol is used when a wireless station which is about to transmit communications, listens to the network (senses the carrier) before transmitting the communications and waits for an opportunity during which it may transmit the communications. The wireless station will not transmit as long as a packet is either currently detected in the air or air time was reserved by another wireless station for a predefined duration of time (virtual carrier sense). According to IEEE 802.11, the wireless station awaits a random period of time and then, if the air resource becomes available during that period, transmits the communications. If the receiver gets the frame intact, it sends back an ACK or a block ACK message (according to the request from the transmitter) to the sender, indicating that the packet has arrived. This protocol is mainly used for multiple-access and significantly reduces the possibility of contention, i.e. that two or more wireless stations will be transmitting at the same time.

However, a known problem in wireless networks that use the CSMA/CA protocol is the problem of the "hidden node" (also known as the "hidden terminal" problem). This problem addresses cases where a plurality of wireless stations (also referred to as mobile subscribers, mobile terminals, mobile, stations etc.) which are connected to the same access point, do not "hear" each other and as a result, two or more stations may transmit at the same time thereby causing a collision. Consequently, the Access Point (AP) is unable to detect neither one of the signals, causing them to retransmit after a random period—in which case collision may still happen again. The problem increases along with the increase in the number of wireless stations.

Some suggestions were made in the art to address the "hidden node" problem. The IEEE 802.11 protocol for example, uses a feature called RTS/CTS mechanism. According to this mechanism, each wireless station that is about to transmit a communication, sends a short Request-To-Send (RTS) packet to its respective access point and the access point returns a Clear-To-Send (CTS) packet. Both packets include the expected duration of the wireless transaction. All the other wireless stations detect the RTS packet or the CTS packet and create virtual carrier sense, which prevents them from accessing the air while the data transaction is still being transmitted.

Unfortunately, simple indoor wireless stations, such as laptops and smart phones, do not always have the support for transmitting the RTS messages. This is mainly because using the RTS/CTS type of negotiation, introduces overhead and decreases total system performance at times when no "hidden node" problem exists.

In addition, in high data rates packets introduced by future 802.11 standards (such as 802.11n, 802.11ac, 802.11ad), the length of the RTS packet may turn out to be longer than regular data packets. In these cases, transmitting RTS packets is not efficient and as a result many 802.11 stations use thresholds for deciding whether to transmit an RTS packet or not. Even in cases where RTS/CTS packets are being used, collisions and "hidden node", problem might also occur in cases of collisions between the RTS packets themselves or between an RTS packet and another packet.

SUMMARY OF THE DISCLOSURE

The disclosure may be summarized by referring to the appended claims.

It is an object of the present invention to provide methods, systems and devices to overcome interference created indoor between unsynchronized endpoint using the CSMA/CA contention protocol.

It is another object of the present invention to provide methods, systems and devices that enable operating in a centralized WiFi system over a distributed antenna system.

It is yet another object of the present invention to provide a centralized WiFi system that may be configured to operate in a sub-nets' configuration Other objects of the invention will become apparent as the description of the invention proceeds.

In one embodiment of the present invention, there is provided a method for reducing collisions created between endpoints of a wireless local area network environment incorporated with a distributed antenna system (DAS).

In an embodiment, a method is provided for managing a wireless local area network (e.g. centralized WiFi network) comprising a distributed antenna system (DAS), wherein the DAS comprises a plurality of station units (STUs) each of which is adapted to communicate wirelessly with one or more wireless stations, and at least one access point unit (APU) connected to the plurality of STUs and adapted to communicate with a respective access point, the method comprising:

at a first STU belonging to the plurality of STUs, receiving a first signal transmitted wirelessly;
conveying the first, signal towards the APU; and
at the APU, adapting the conveyed signal to be transmitted to the access point associated with the AU, and conveying a return signal towards at least two STUs belonging to the plurality of STUs.

The term "Distributed Antenna System" (hereinafter: "DAS") as used herein throughout the specification and claims should be understood to encompass a network of spatially separated antenna nodes connected to a common source via a transport medium that comprises RF splitters and couplers or other elements that are operative to allow signal delivery (e.g. fiber transceivers, amplifiers, and to some extent wireless media). The DAS network provides wireless service within a geographic area or structure based on a plurality of radio termination units also known as station units (STUs), which are connected to the access point unit (APU), by some kind wire cable (e.g. CATV line, a wire line, coaxial line, Fiber Optic line), wireless, line or mixed wire-wireless link. DAS systems may be implemented in multi-tenant buildings, dense urban environment, large halls, suburban areas and the like.

The term "wireless station" as used herein throughout the specification and claims should be understood to encompass a cellular telephone, a portable computer (e.g. laptop, tablet), a personal digital assistance (PDA), a wireless setup box or any other WLAN device.

As will be appreciated by those skilled in the art, the first STU that is conveying the first signal towards the APU may be one of the STUs from among the plurality of STUs towards which the return signals is forwarded. However, since at the time that first STU is in its uplink mode (while it continues to convey the signal towards the APU), that return signal will simply be ignored by the first STU, as long as the return signal is received while the first STU is in its uplink mode.

According to another embodiment, the at least one access point unit (APU) is connected non-wirelessly to the plurality of STUs. In the alternative, the at least one access point unit (APU) may be connected wirelessly over another RF frequency, or may be connected partially wirelessly and partly non-wirelessly to the plurality of STUs (e.g. wirelessly to some of the STUs and non-wirelessly to others).

According to another embodiment the signal conveyed from the STU to the APU includes a transformation of the first signal such as frequency conversion, digital sampling, time compression or any outcome of a transmission method which saves/retains the information included in the first signal (i.e. an outcome of a signal processing method that prevents loosing information that had been included in the first signal).

According to another embodiment, upon receiving the return signal at each of the at least two STUs, a prevention signal is transmitted by at least one of the at least two STUs to one or more wireless stations located at a geographical proximity of the respective STU, wherein the prevention signal is used to indicate to the one or more wireless stations to refrain from transmitting communications towards, their respective STUs. As will be appreciated by those skilled in the art, the prevention signal is typically a WiFi signal.

Preferably, the prevention signal conveyed by the at least one of the at least two STUs is essentially identical to the first signal. In such a case once the return signal is received from the APU, the respective STU may transform the return signal to be essentially identical to the first signal and transmit it to the associated wireless stations associated therewith. In the alternative—the prevention signal is a signal different from the first signal (e.g. a pre-defined message).

In accordance with another embodiment, the return signal conveyed towards the at least two STU is essentially identical to the signal conveyed towards the APU, or a frequency conversion of the conveyed signal, i.e. the APU may use a loopback procedure that includes signal amplifying, and re-sending it back with or without frequency conversion, after compensating for the expected loss due to the two directions air path loss. In the alternative, the return signal may be a different signal that preferably characterizes the first signal in order to provide the STU(s) receiving the return signal, an indication as to the period of time during which it/they should not switch to its/their uplink mode.

According to still another embodiment, the conveyed signal is forwarded by the STU after the expiry of a pre-defined period of time that extends from the time at which the first signal was received at that STU. Waiting for a pre-defined period of time also known in the art as "time hysteresis mechanism", is recommended in order to ensure that packets will not be interrupted during their transmission.

By yet another embodiment, plurality of STUs is divided into at least two groups of STUs, and wherein at least one operating condition of the wireless stations associated with each of the STUs comprised in one of the at least two groups of STUs is different from said at least one operating condition of the wireless stations associated with each of the STUs comprised in another one of the at least two groups of STUs. This embodiment is suitable in cases where part of the STUs experience interference while others do not, for example, an STU located at the upper floor of a multi-tenant building may be subjected to interference due to the existence of an antenna on top of that building, therefore the frequency used for all the STUs located in that upper floor may be different from the frequency used for the rest of the STUs located in that multi-tenant building.

The term "multi-tenant building" as used herein throughout the specification and claims should be understood to be any building with a large number of rooms in which people may stay for any period of time. Examples for such a multi-tenant building are: hotels, apartment and office buildings, factories, schools and the like.

In accordance with another embodiment, prior to conveying the first signal towards the APU, the method further comprising a step of determining whether the first signal is to be conveyed from the STU to the APU. In case it is determined (possibly by that first STU) that the first signal is not to be conveyed to the APU, the sensitivity of the first STU for receiving transmissions along the wireless media is preferably lowered by either reducing its receive gain, or by reducing the transmit power towards the DAS network. This embodiment is applicable to minimize the noise that is conveyed either to the AP or to other stations that would have received the loopback signal. The sensitivity may be lowered in such a way that the noise floor is brought to the thermal noise level or less.

The first STU may determine to prevent a first signal that had originated from an energy-bursts generating source (e.g. WLAN packets or interference bursts), from entering the DAS network. This may be done by refraining from switching to uplink mode during the specific burst of energy, and therefore, these bursts will not flood the entire DAS network. This embodiment is particularly applicable in scenarios where one of the STUs receives signals from other devices that transmit at similar frequency as the WiFi frequency (e.g. microwave oven), thereby Creating interference that might flood the whole DAS network with the noise. It can also be applicable in a case where too many WiFi packets arrive from a single STU (or even from a single wireless station) and flood the whole DAS network. Criteria for determining whether to forward the first signal or not may be based on signal properties, such as for example power level (between predefined thresholds), bandwidth, maximum value of correlation with a reference signal, maximum value of autocorrelation in a predefined delay or any other criterion known in the art per se. Also, a criterion applicable herein may be an arbitrary, pre-defined criterion.

Identification of such a scenario can be done by the STU by counting the number of bursts it is expected to convey to the DAS network, i.e. by counting the number of times it has to switch to uplink mode, and/or by measuring the duty cycle, i.e. the relative time the STU was in uplink mode. In case one or both of these criteria is higher than a predefined threshold, the system may react to the interference as explained above.

In other words, according to the embodiment described above, the method provided, further comprising a step of lowering transmission gain associated with the first STU upon determining that said first signal should not be conveyed towards said APU.

According to another embodiment, the system (e.g. at the APU which belongs to the system) may decide to completely deny service to the interfering STU, until the interference decreases or disappears.

In accordance with still another embodiment, in a case that different signals that are transmitted essentially simultaneously by at least two wireless stations each associated with a corresponding STU, wherein said at least two corresponding STUs are associated with a single APU, wherein said at least two different signals can be separated from each other, and wherein said APU is configured to receive said different signals and to take at least one of the following actions: to sum the different signals thereby obtaining a first signal to be conveyed towards an access point (AP); to select one of said different signals and convey it towards an AP; or to convey each one of the at least two different signals simultaneously to a different AP.

By yet another embodiment, in case that the APU is configured to select one of said different signals and convey it towards the AP, the selection may be based on any criteria such as one of the following criteria: selecting the first of the different signals received at the APU, selecting the strongest of the different signals received at the APU, randomly selecting one of the different signals received at the APU.

In accordance with still another embodiment, in case the APU is configured to convey each one of the at least two of the different signals received simultaneously to a different AP (which may be co-located with the other AP), each of the different AP having the same MAC address, in order for each AP to return ACK or block ACK to the at least two stations.

According to another aspect, there is provided a system operative to interact with a distributed antenna system (DAS), the system comprising:
- a plurality of station units (STUs), each of which is adapted to:
  - communicate wirelessly with one or more associated wireless stations and receive a first signal transmitted wirelessly by at least one of the associated wireless stations; and
  - convey the first signal towards the APU;
- an access point unit (APU) connected to the plurality of STUs, wherein the APU adapted to:
  - adapt the conveyed signal received from a first STU belonging to the plurality of STUs to be transmitted to a respective access point associated with the APU; and
  - convey a return signal towards at least two STUs belonging to the plurality of STUs.

By yet another embodiment, upon receiving the return signal at each of the at least two of STUs, each of the at least two STUs is operative to transmit to one or more wireless stations located at its geographical proximity, a prevention signal indicating to these one or more wireless stations to refrain from transmitting communications towards their respective STU.

In accordance with another embodiment, the return signal conveyed towards the at least two STUs is essentially identical to the conveyed signal or is a frequency conversion of the conveyed signal.

According to still another embodiment, the APU is operative to convey the return signal only after expiry of a pre-defined period of time that extends from the time at which the first signal was received at that APU.

By another embodiment, each STU is adapted to await expiry of a pre-defined period of time following the conveying of the first signal therefrom, before entering a mode that enables the STU to receive other wireless signals.

In accordance with, still another embodiment, the plurality of STUs is divided into at least two groups of STUs, and wherein the APU is further adapted to control wireless stations associated with each of the STUs comprised in one of the at least two groups of STUs by changing at least one of their operating conditions so that the at least one changed operating condition of the wireless stations associated with each of the STUs comprised in that group becomes different from the corresponding operating condition of the wireless stations associated with the STUs that belong to another one of the at least two groups of STUs.

According to another embodiment, prior to conveying the first signal towards the APU, the STU determines whether the first signal should be forwarded to the APU. Preferably, each of the plurality of STUs is operative to determine whether their respective first signal should be forwarded to the APU, based upon at least one pre-defined criterion. Such a pre-defined criterion may be for example: signal power level within a predefined bandwidth that exceeds a pre-defined threshold, signal bandwidth that exceeds a pre-defined threshold, correlation with a reference signal that exceeds a pre-defined threshold, autocorrelation with a pre-defined delay, that exceeds a pre-defined threshold or any other criterion known in the art, or combination thereof. Some parameters and criteria may be the same for all the STUs belonging to the same plurality of STUs (for example: frequency and bandwidth), but also according to the present invention different criteria may be used for different STUs that belong to the same plurality of STUs (for example: power level threshold).

According to another embodiment, the system comprises a plurality of APUs each of which is connected to a different plurality of STUs, wherein all of the plurality of APUs, use the same DAS network. For this case, preferably each of the different pluralities will be distinguished from the other pluralities of STUs while communicating with its respective APU by the use of a frequency (or frequencies) different from that (those) used by each of the other pluralities of STUs. However, as will be appreciated by those skilled in the art, the wireless frequency used for communication between the STUs and their associated wireless stations may be either the same or different from those used in the other pluralities of STUs.

BRIEF DESCRIPTION OF THE DRAWINGS

For a more complete understanding of the present invention reference is now made to the following detailed description taken in conjunction with the accompanying drawings wherein.

DETAILED DESCRIPTION

In this disclosure, the verb "comprise" is intended to have an open-ended meaning so that when a first element is stated to comprise a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

The present invention may be implemented in WLAN systems in an active DAS environment to overcome interference created indoor between unsynchronized endpoints using the CSMA/CA contention protocol, mainly the various IEEE 802.11 standards, such as IEEE 802.11 a/b/g/n/ac/ad.

A detailed description of a DAS network is described in U.S. Pat. No. 7,403,742, which is hereby incorporated by reference. The active DAS environment comprises a plurality of radio termination units also known as station units (STUs), which are connected to an access point unit (APU) by either by a non-wireless media (e.g. CATV line, a wire line, coaxial line, Fiber Optic line, and the like), wireless media or partly wireless media. For the sake of simplifying the description of the various embodiments, the following description relates to APUs connected non-wirelessly to the STUs, but as will be appreciated this is done by way of example only, and should not be considered as limiting in any way the scope of the invention.

On one side the DAS termination units (STUs) forward the signals received from their associated wireless stations towards the respective AP via the DAS network, and on the other side, the DAS termination units (STUs) receive signals via the DAS network from the respective AP and forward the received signal to the wireless stations associated with these STUs, respectively. As a result, by distributing DAS termination units (STUs) at different locations, SNR increases, and both system coverage and total capacity are improved. In addition, the DAS network allows using less access points, resulting in higher air efficiency, due to less collisions and less management overhead (beacons, probe requests, etc.).

Due to the fact that WLAN is Time Division Duplex (TDD) based, the uplink and downlink transmissions may be conveyed at the same frequency and bandwidth, but not at the same time slot. Thus, an STU may operate in one of two modes. It can either be in a transmit mode by which signals received from the APU/AP are forwarded towards the wireless stations associated therewith, or in a receive mode, by which signals received from the wireless stations associated with the STU are conveyed to the APU/AP. Because the cable connection between the access point and the termination points is either in a star or a tree topologies, Using RF splitters and couplers, the "hidden node" problem may occur.

Figure 1:
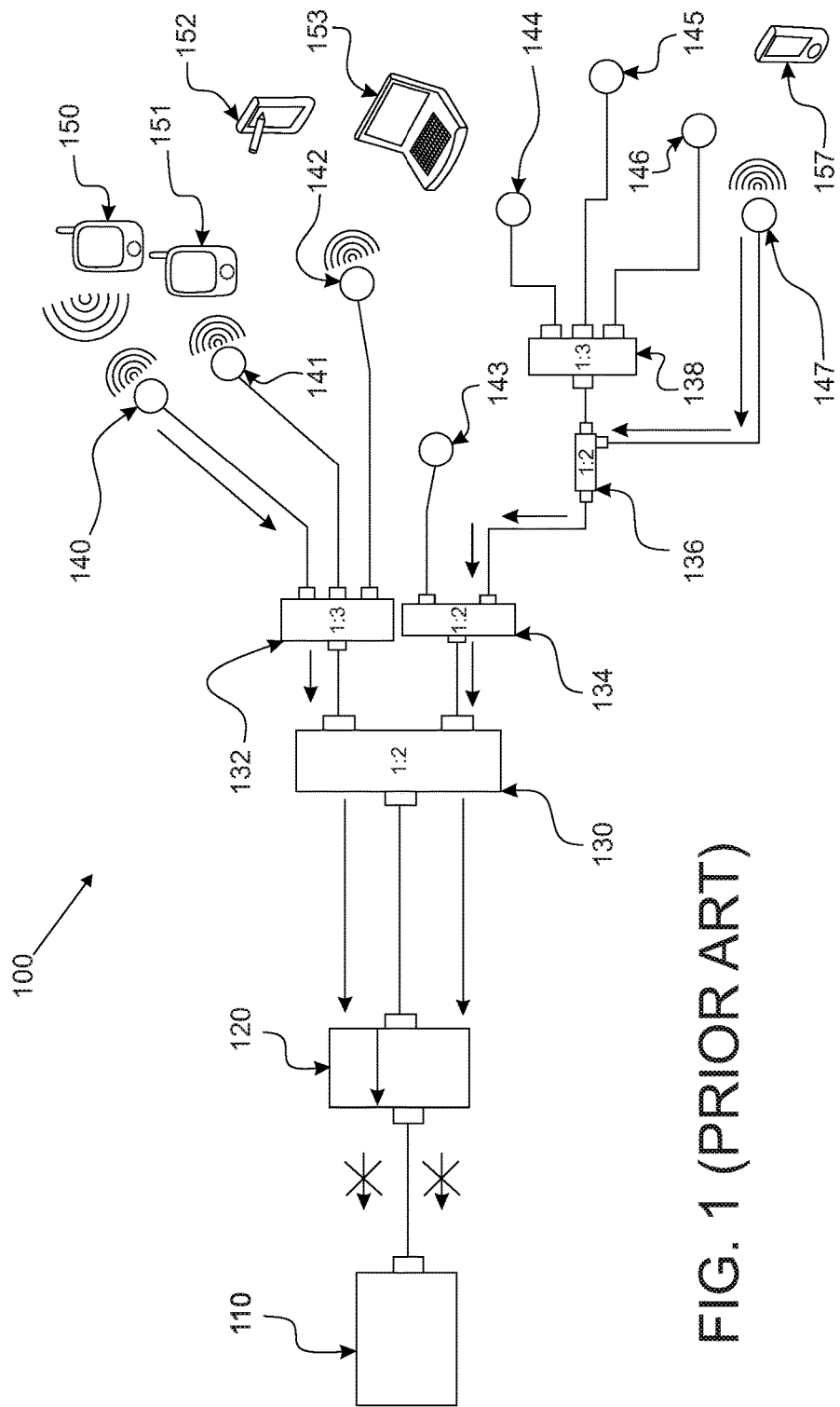
FIG. 1—demonstrates the "hidden node" problem as experienced in a network using DAS in a tree topology.

FIG. 1 demonstrates the "hidden node" problem as it happens in a network using DAS having a tree topology (100). The DAS in this example comprises an Access Point (AP) 110, an Access Point Unit (APU) 120, RF splitters/couplers 130, 132, 134, 136 and 138 and DAS radio termination units also known as station units (STUs) 140, 141, 142, 143, 144, 145, 146, and 147. In this example STU 140 communicates with wireless station 150, STU 141 communicates with wireless station 151, STU 142 communicates with wireless stations 152 and 153, while STU 147 communicates with wireless station 157. The arrows in the Fig. demonstrate the "hidden node" problem. Let us assume that wireless station 150 and wireless station 157 are located at different floors in a multi-tenant building, and cannot "hear" each other. When wireless station 157 tries to transmit it may do so while wireless station 150 communicates with the AP. Each of STUs 140 and 147 conveys the packets it receives via the respective RF splitters/couplers towards the APU. However, since station 157 is not aware that station 150 communicates with the AP (110) at this time, a collision will occur and the AP (110) will receive a corrupted signal. The more stations wish to communicate with the AP, the more collisions will occur, causing the network to be ineffective.

Figure 2:
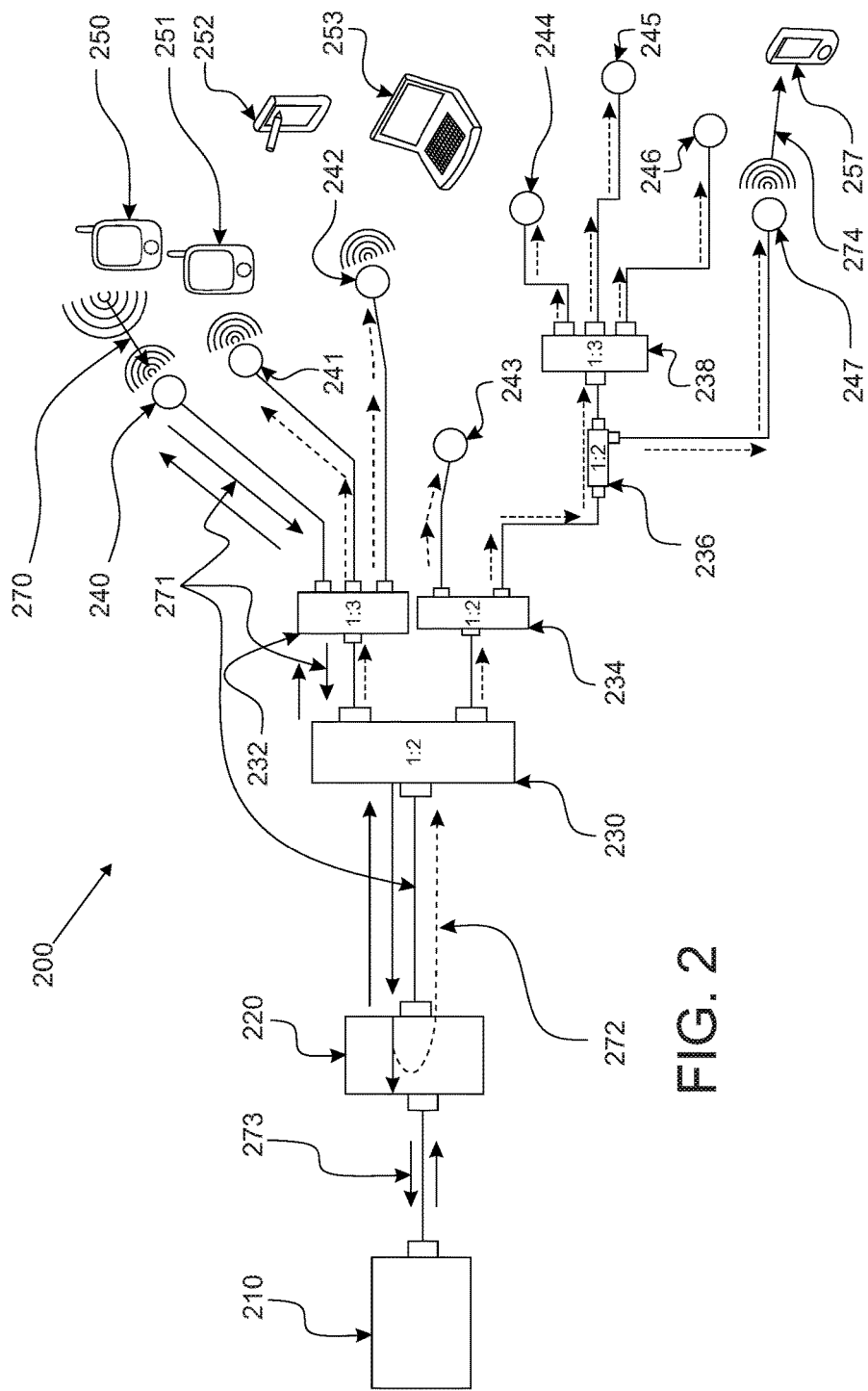
FIG. 2—illustrates a network using DAS in a tree topology, wherein the "hidden node" problem is solved.

FIG. 2 illustrates a network using DAS in a tree topology similar to the network demonstrated in FIG. 1, wherein the "hidden node" problem is solved according to one embodiment of the present invention. The DAS (200) in this, example comprises an AP (210), an APU (220), RF splitters/couplers (230, 232, 234, 236 and 238) and STUs (240, 241, 242, 243, 244, 245, 246, and 247). Similarly to the configuration illustrated in FIG. 1, wireless stations 250, 251, 252, 253 and 257 communicate with STUs 240, 241, 242 and 247 respectively. Let us now follow the arrows in this Fig. in order to understand the solution of the "hidden node", as exemplified by this embodiment. The Uplink process starts when wireless station 250 transmits a packet comprise in a first signal 270 to STU 240. STU 240 may convert the first signal 270 to a conveyed signal being at a different (intermediate) frequency, (i.e. to a second signal 271) prior to conveying the packet towards the APU (220). When the APU receives the packet comprised in the second signal 271 it performs two actions. The first being to convert the frequency back to the WiFi frequency (in case the signal was converted to a different frequency) and then to convey the packet towards the AP (210) comprised now in a third signal 273, while the other action is to carry out a loopback transmission, thereby to deliver the second signal 271 back to all other STUs (241, 242, 243, 244, 245, 246, and 247) of the DAS network after carrying out a frequency conversion thereby to receive fourth signal 272, whereas at each STU to convert the frequency back to the WiFi frequency (e.g. fifth signal 274), to enable carrying out the CSMA/CA protocol properly.

The downlink process starts when the AP (210) wishes to convey packets to one or more of the wireless stations. In this direction, the signal is converted by the access point unit (APU) to another (intermediate) frequency, and then be delivered to the STUs using the DAS network infrastructure. In this case, the STU will convert the frequency back to the original WiFi frequency and will transmit the signal towards the respective wireless station.

Figure 3:
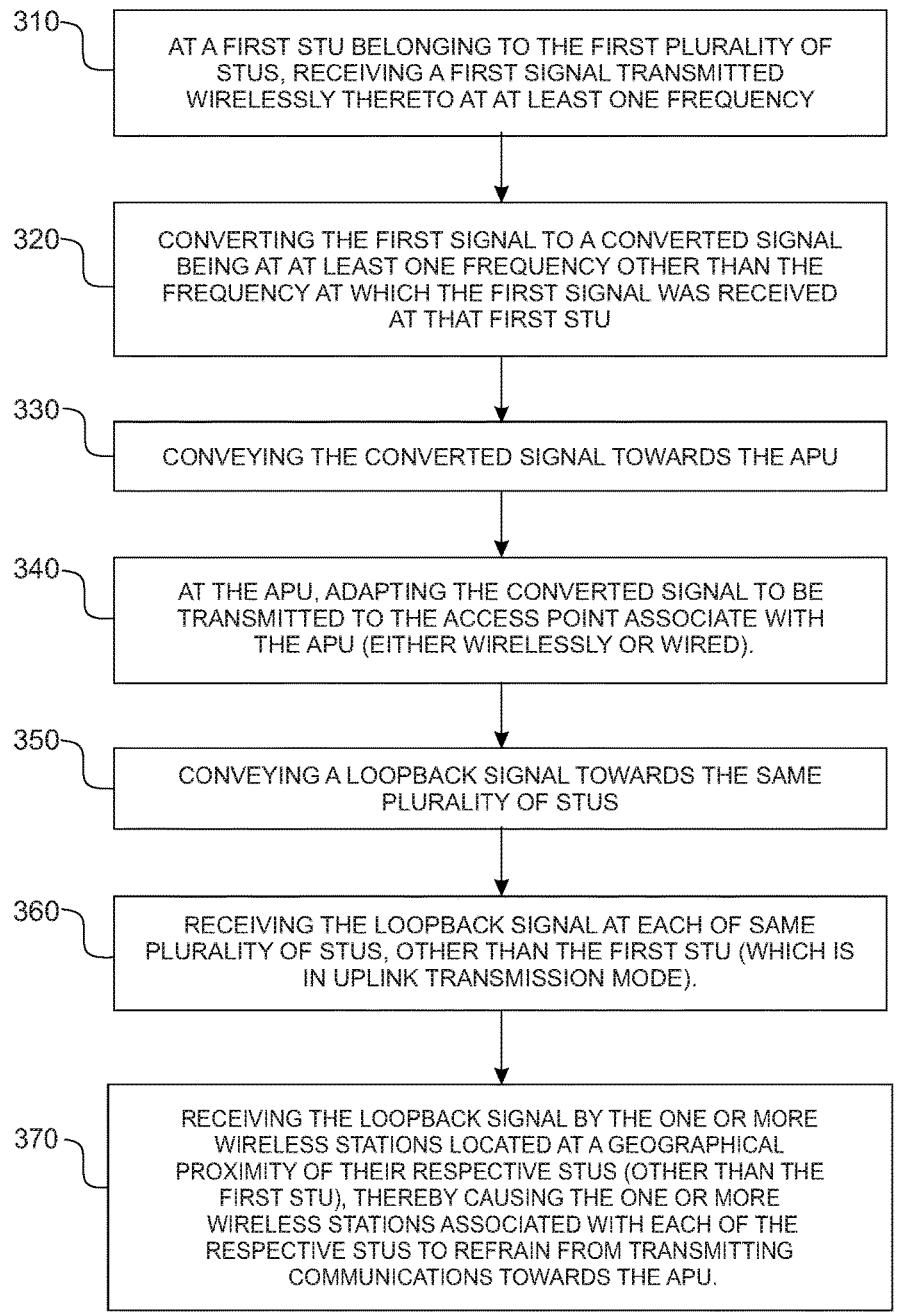
FIG. 3—demonstrates a flow chart of a method of implementing an embodiment of the present invention.

FIG. 3 illustrates a flow chart of a method for implementing an embodiment of the present invention. According to this embodiment, at a first STU belonging to the plurality of STUs, receiving a first signal transmitted wirelessly (step 310). Next, the first signal may be converted to a signal to be conveyed towards the APU, for example being at at least one frequency (several frequencies may be in case of MIMO) other than the frequency at which the first signal was received at the said STU (step 320). The converted signal is then conveyed towards the APU (step 330) and at the APU, the converted signal is adapted to be transmitted to the access point associated with the APU (e.g. by changing its frequency to a wireless compatible frequency) (step 340) and conveying a return signal towards at least two STUs belonging to the same plurality of STUs (step 350).

The return signal is conveyed towards (step 350) and received by the same plurality of STUs (step 360), and these STUs send a prevention signal (e.g. by converting the frequency of the return signal to a wireless compatible frequency signal) to the wireless stations associated therewith causing them to refrain from transmitting as long as the currently transmitting wireless station is still transmitting.

Figure 4:
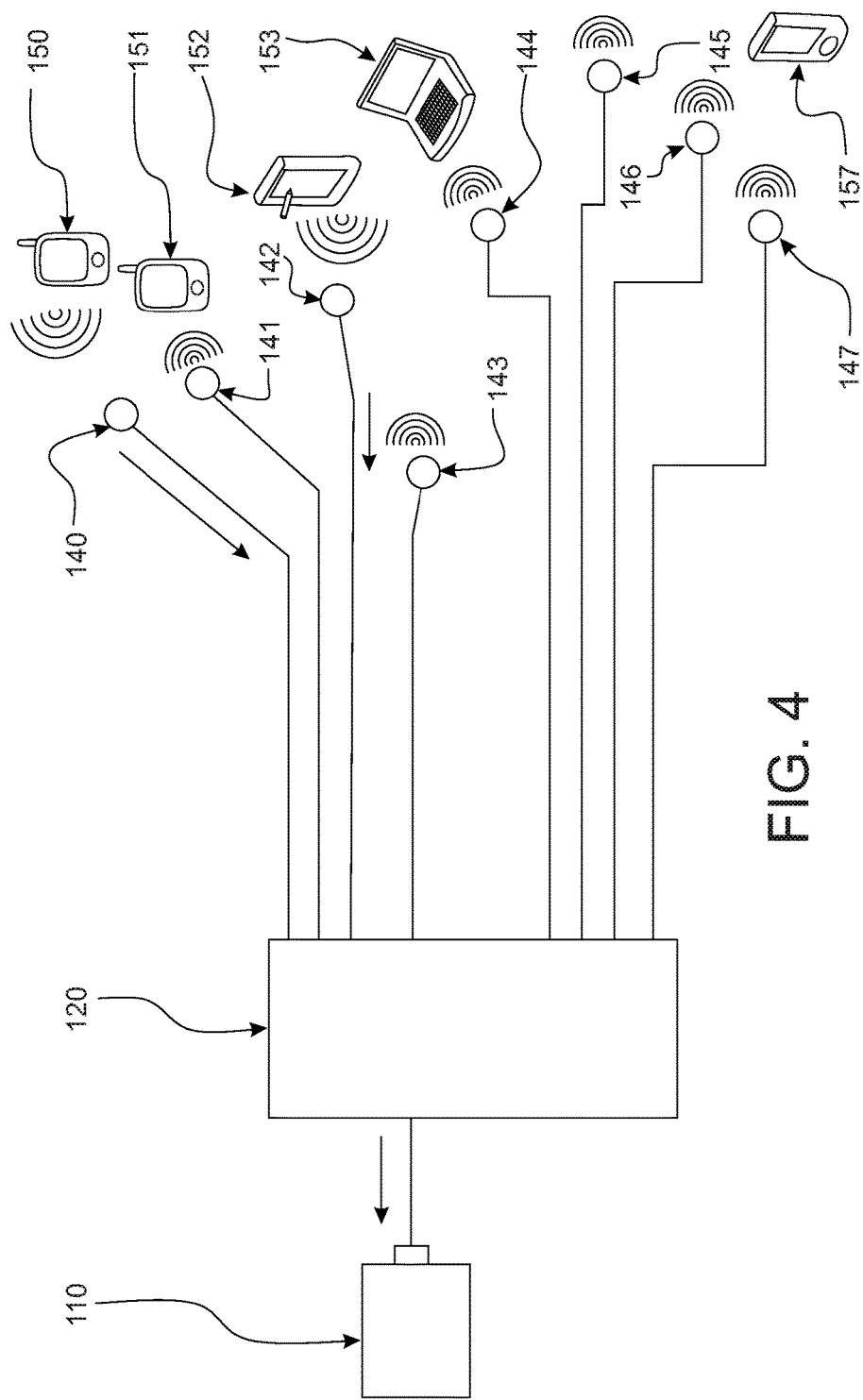
FIGS. 4 to 6—illustrate different system configurations in which different signals are transmitted essentially simultaneously by two wireless stations thereby causing collision.

FIG. 4 exemplifies a system having a star configuration, in which when APU 120 detects a situation whereby a collision occurs between signals generated at wireless stations (i.e. remote units) 140 and 143, it determines which of the two signals will be forwarded to AP 110. For example, if 143 was selected, the APU will forward only the RU 143 signal to the AP 110. Optionally, the APU 120 can send a command to all the RUs except for TU 143, to enter their downlink mode.

Figure 5:
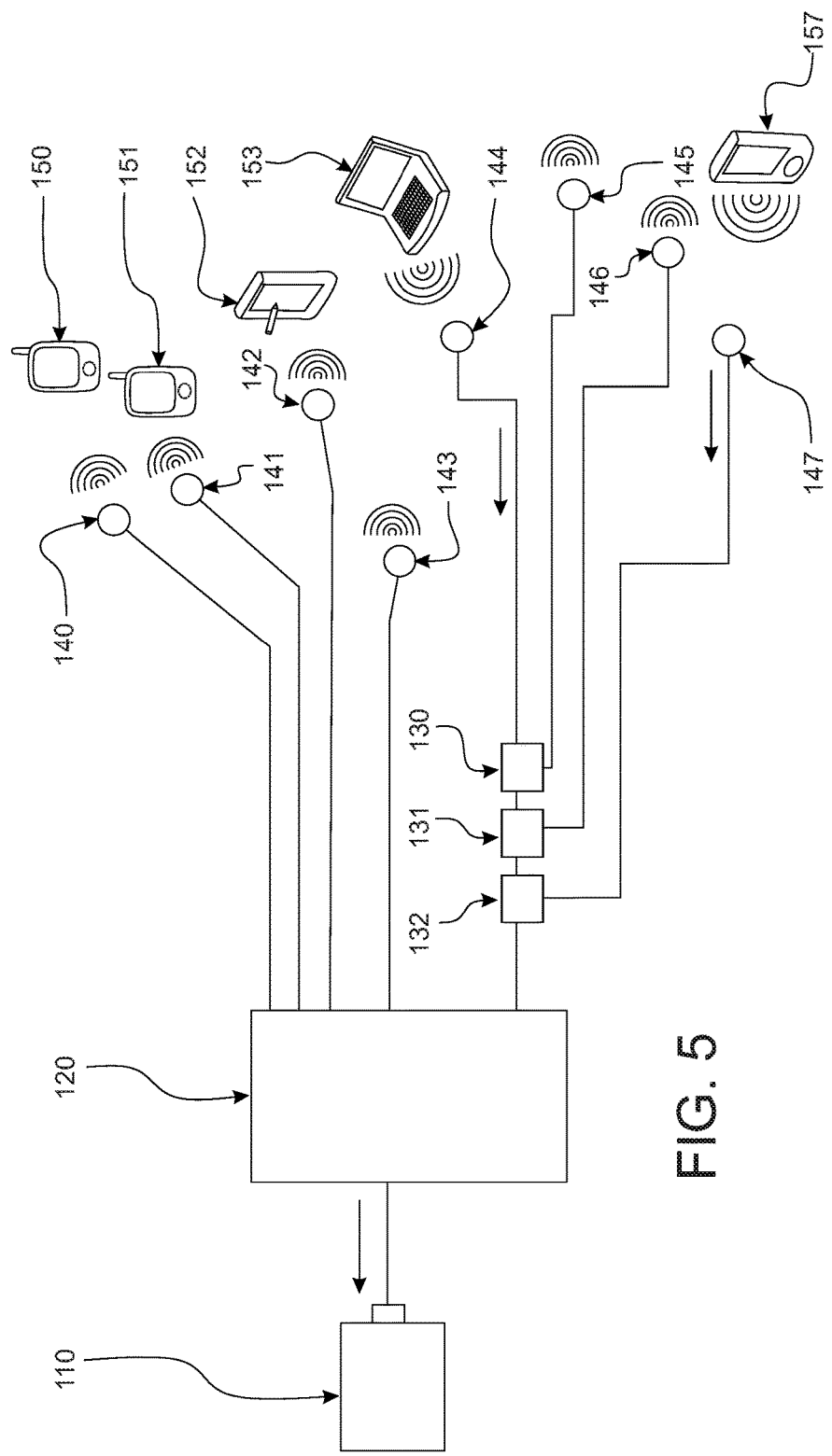

FIG. 5 exemplifies a system wherein RUs 144 to 147 are connected in parallel (chain configuration) to APU 120. In case of a collision between signals transmitted from various wireless stations, each element of the chain may determine which signal will be forwarded by that element. For example, chain unit 130 passes RU 144 signal, this signal then continues to chain unit 131 and then to 132 which in turn determines that RU 147 signal will be forwarded to APU 120.

Figure 6:
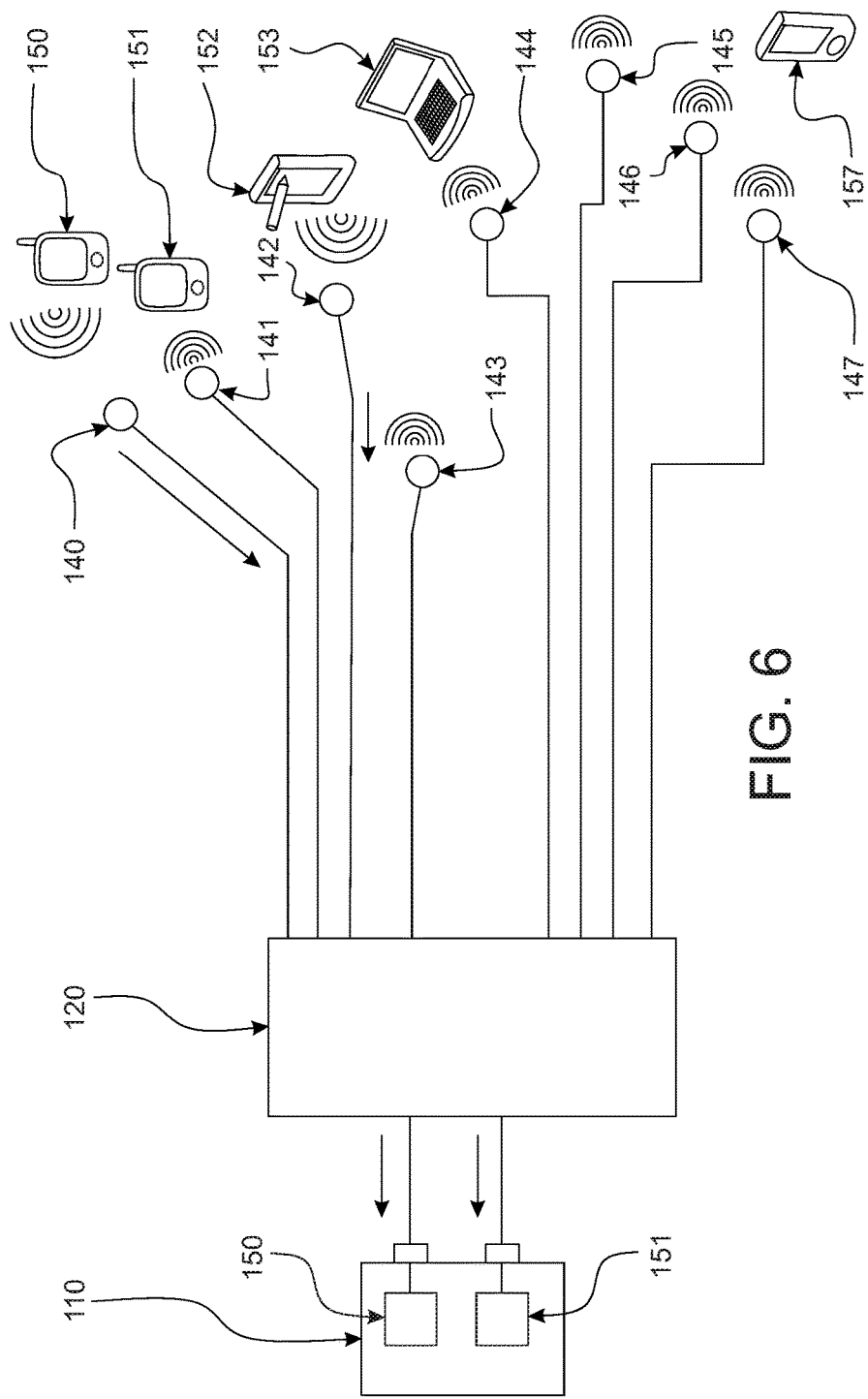

FIG. 6 illustrates a dedicated AP configuration. When APU 120 detects a situation whereby a collision occurs between signals generated at wireless stations 140 and 143, it determines which of the two signals will be forwarded and to which radio element (150 or 151) of AP 110. For example, signal generated by RU 140 is sent to radio element 150 while signal generated by RU 143 to radio element 151. Both radio elements 150 and 151 have the same MAC address and both will respond by transmitting ACK packets towards the respective wireless stations 140 and 143. APU 110 will preferably ensure that each ACK response will be forwarded to the correct respective RU.

The Station Unit (STU)

According to one embodiment, the following STU (the DAS radio termination unit) is provided. The STU unit has three main operating modes:

Uplink mode—when the STU receives WiFi signals from one or more wireless stations, it transforms the signal into a conveyed signal and forwards the conveyed signal along the DAS towards the AP direction.

Downlink mode—when the STU receives via the DAS network signals that had been originally transmitted by either the AP or by a loopback mechanism (e.g. return signal), and transforms these signals (if required) in order to be transmitted to the one or more wireless stations associated with that STU.

Idle mode—when the STU is waiting to receive a signal via the DAS network or to receive a signal from one or more wireless stations.

According to one embodiment, switching from idle mode to uplink mode or downlink mode of the STU is done by sensing both media, the wireless stations and the DAS network. In other words the STU switches to uplink mode when a signal is detected from one of the wireless station and to downlink mode when a signal is detected to arrive from the DAS network. The signal detection can be done for example by comparing the energy at the expected signal frequency and bandwidth to a threshold or by implementing a WiFi signal carrier detector. According to one embodiment the default mode of the STU is see to idle mode allowing either AP signals (broadcast, multicast or unicast packets originated from the AP), loopback signals (signal returned to the STU while applying the APU loopback mechanism) or STA signals (packet originated from the wireless stations) to be detected by the STU. Upon detecting a signal that had been transmitted from a wireless station, the STU may change its mode to the uplink mode and remain at that mode as long as the signal is being transmitted from that wireless station. Upon detecting a signal that had been originated from the DAS network (either a signal from the AP or a loopback signal), the STU may change its mode to the downlink mode and remain at that mode as long as the signal is being transmitted from the DAS network.

According to another related embodiment the switching between uplink of downlink modes to idle mode should be protected by using a time hysteresis mechanism. This means that when the transmission from the wireless station in completed, the STU should wait a short period of time before returning to its idle mode. The time hysteresis mechanism is recommended in order to make sure that packets will not be interrupted during transmission. On the other hand, the STU should switch to idle mode and then to downlink mode before a response packet is (such as Ack or block Ack) expected. For example, the hysteresis time may be shorter than a WiFi standard timing (SIFS), typical hysteresis time should be 5 μsec, or in between 2 to 8 μsec.

The Access Point Unit (APU)

According to another embodiment, the following APU is provided. The APU unit has three main operating modes:

Uplink mode—the APU receives via the DAS network a signal originally transmitted, by the wireless stations, transforms the signal to the original form (as was received by the STU from the wireless stations) and delivers the signal to the AP. According to one embodiment, upon receiving the signal from the respective STU that was transmitted from a first wireless station, the APU loops back the signal via the DAS network towards STUs connected to that APU transforms the signal to the original form (as was received by the STU from the wireless stations). When the looped back signals are eventually received at the other wireless stations after being conveyed via the other STUs that are connected to the APU (e.g. the return signals), the other wireless stations will not enter their respective transmit mode, as they will be prevented from transmission as long as the first wireless station is transmitting. The loopback procedure described above may include frequency conversion and signal amplifying prior to its return, compensation of loss due to double air path loss, etc. In addition, the returned signal that loops back to the other wireless stations does not have to be identical to the signal transmitted by the first wireless station, as long as it conveys the information required by the other wireless stations to prevent them from transmitting while the first wireless station is transmitting communications towards the AP.

Downlink mode—the APU receives signals transmitted by the AP and transforms them and conveys them towards the wireless stations via the DAS network.

Idle mode—when the APU is waiting to receive a signal via the DAS network or a signal from the AP.

According to one embodiment, the default mode to be applied for the APU is the idle mode. When the APU senses the transmission of communications from the AP, (e.g. by sensing high energy conveyed along its link with the AP), it would change its mode to the downlink mode for as long as the transmission from the AP takes place. Similarly to the above description of the STU, changing modes in the APU should preferably be protected by applying a time hysteresis mechanism. This means that when the AP transmission has been completed, the APU should wait for a short period of time before returning to its idle mode, thereby minimizing the risk that packets are not interrupted during their transmission from the AP. On the other hand, the APU should switch to idle mode and then to uplink mode before a response packet is expected (such as ACK). Therefore, hysteresis should be shorter than WiFi standard timing (SIFS), and a typical hysteresis time should be in the order of 5 μsec or in between 2 to 8 μsec. Similarly, when an uplink signal exists, the APU switches to uplink mode and performs both uplink and loopback. When the transmission has been completed, the APU would preferably wait for a short period of time before returning to its idle mode, thereby minimizing the risk that packets are not interrupted during their transmission from the wireless stations.

The loopback amplifier gain should preferably be such that enables delivering the return (loopback) signal at the same power level as the original signal, to a predefined distance from ail the STU (i.e. about 5-10 meters). For example: If a signal is received at −60 dB at the receiving STU, the loopback mechanism gain should be such that would bring the signal power level at 5-10 meters away from another STU to −60 dBm. Typical amplifier gain should be in the range of from about 50 to about 70 dB.

Managing External Interferences

One scenario that may occur when implementing embodiments in accordance with the present invention, is, that the STU may receive return signals from the APU's loopback mechanism, even though these return signals had not been generated as a result of a transmission made by a wireless station. Let us consider the following example. One of the STUs receives signals from another device that transmits at a similar frequency as the WiFi frequency (e.g. wireless baby monitor). In such a case, if the APU were applying the loopback mechanism it would have spread the baby monitor signal throughout the DAS network and the whole DAS network might be flooded by the interference, and consequently preventing legitimate transmissions from wireless stations and from the access point to be exchanged with their respective recipients. According to one approach provided by the present invention, i.e. the sensitivity control approach, an STU that experiences high level of interference will decrease its sensitivity by either reducing its receive gain until the interference stops or by decreasing the transmit power of the STU towards the DAS network.

Another type of system interference handling is the load balancing approach, by which less uplink opportunities are provided to an STU that generates too much activity at the network. For such an STU, not every uplink packet or burst will be conveyed to the network. This method may be used to ensure that there is no interference flooding of the whole DAS network. This approach can also ensure that while there is no flooding of the network due to a single wireless station/STU, still, each wireless station/STU is provided with a minimum level of service.

Denying an STU from uplink opportunities may be done either arbitrary, i.e. when the decision on which burst of energy is delivered to the DAS network, is not based on signal properties, but may be based partially or exclusively on the signal properties. Example for such properties are signal power level, signal center frequency, signal bandwidth, correlation with a reference signal, autocorrelation, with using a predefined delay, 802.11 signal determinations or any other applicable criteria or combination thereof.

Oscillations Problem

Due to the feedback mechanism, oscillations may occur in the system if the received signal due to the feedback is stronger than the signal that originally caused the feedback. Oscillations occur for example when one STU receives transmissions from another STU as a result of the loopback mechanism and inserts it back into the network.

Any one of the following solutions may be applied to overcome this oscillations problem:

1. Echo cancelling mechanisms in the specific STU which reception would trigger the oscillations or in all STU's;
2. Lowering sensitivity of the STU which reception would trigger the oscillations; and
3. Lowering transmit power of the STU which transmission would trigger the oscillations.
4. Generating a beam Tx pattern at the STU which transmission would trigger the oscillations that is leveled to minimize the signal to the STU which reception would trigger the oscillations.
5. Generating a beam Rx pattern at the STU which reception would trigger the oscillations that is leveled to minimize the signal from the STU which transmission would trigger the oscillations.
6. An echo cancelling mechanism is a linear digital filter that reduces the echo from the received signal. This filter may be set at the STU and be either calculated in a calibration process or dynamically adapt its coefficients according to received signals.

In any case, STUs may be adapted to limit the power they transmit at to the DAS network, in order to avoid saturating the DAS network.

As will be appreciated by those skilled in the art, other solutions for the oscillations problem may be implemented all without departing from the scope of the invention.

DAS Calibration Process

According to another embodiment, a calibration process is provided in order to minimize oscillations occurring between STUs, where one STU receives transmissions from another STU as a result of the loopback mechanism. The calibration process may be performed by the APU and/or by a separate monitoring system. One example of such a calibration process can be based on pilot signal transmission from each STU, one at a time. If there is an oscillation problem, then the APU is expected to observe oscillations with increasing power (until saturation). In this case, APU should instruct the STU to lower its transmission gain, until the oscillation would cease. Another example for such a calibration process is to allow transmission of a signal from the APU downstream and then enabling each time one STU to receive the transmitted signal. In case the enabled STU receives the downstream signal from the wireless media, its sensitivity will be lowered until the signal reception is stopped. By a further example demonstrating a calibration process, a signal is transmitted from the APU downstream and then to test if any STU receives this downstream signal from the wireless media. If in the affirmative, its sensitivity will be lowered until the signal reception is stopped.

The calibration process may be performed periodically as maintenance to the complete system.

Resources' Management in DAS

According to one embodiment, in some cases, particularly when network interference at one location may be different from those at other locations it may be required to operate at different frequencies in different locations, i.e. the STUs will operate in a sub-net configuration. However, in order to establish such a configuration, the AP (via the DAS) may need to inform the wireless stations associated with STUs which frequency should be used, so that all the wireless stations associated with one of the STUs groups will be using one frequency whereas all the wireless stations associated with another one of the STUs groups will be using another frequency. The information on which frequencies to be used by a particular wireless station may be included in the beacon frame and/or probe response frames of the transmissions transmitted by the AP. Therefore, the AP may decide to indicate its support of different frequencies by using multiple beacon transmission and by returning different probe responses to probe requests. The frequency indication in the beacon and in the probe response packets may be different, according to the frequency used at the STU. This method is known as multiple BSSID, used only with a different frequency per SSID. For example, let us assume a case where according to the protocol used, the beacon frame is transmitted every 100 msec and indicates transmission in channel number 1. In addition another beacon is transmitted every 100 msec, with a 50 msec offset relative to the previous beacon indicating transmission in channel number 6. As a result, beacons will be transmitted every 50 msec, each time indicating a different frequency. Wireless stations will associate to the AP according to one of the frequencies.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A communication system comprising:
a Distributed Antenna System (DAS) network comprising one or more Access Point Units (APUs) and two or more Station Units (STUs);
wherein a first STU (240) is to receive, from a first wireless communication station (250), an uplink communication comprising a first signal (270) being at a first frequency, transmitted over a first Wi-Fi connection, and carrying one or more packets;
wherein the first STU (240) is to convert the first signal (270) to a second signal (271) being at a second, different, frequency; wherein the first STU (240) is to convey said one or more packets towards an APU (220), via said second signal (271) being at said second, different, frequency;
wherein the APU (220) is (a) to receive from said first STU (240) said second signal (271) carrying said one or more packets, and (b) to transmit a third signal (273) carrying said one or more packets and being at said first frequency, towards an Access Point (AP), and (c) to also perform a loopback transmission and by transmitting a fourth signal (272) to at least a second STU (241), wherein the loopback transmission comprises a transmission of a prevention signal indicating to a second wireless communication station (251) to refrain from transmitting towards its respective second STU (241);
wherein the second STU (251) is to receive said fourth signal (272) from the APU (220), and to convert said fourth signal (272) into a fifth signal (274), and to transmit said fifth signal (274) over a second Wi-Fi connection to said second wireless communication station (251), wherein said fifth signal comprises said prevention signal indicating to said second wireless communication station (251) to refrain from transmitting towards its respective second STU (241),
wherein the APU (220) is
(a) to detect an uplink collision between (I) a first wireless signal generated at the first wireless communication station (250), and (II) a second wireless signal generated at the second wireless communication station (251);
(b) to determine which one of the first and second wireless communications signals, is to be forwarded to said Access Point (AP);
(c) to forward to said Access Point (AP) only one of the first and second wireless communication signals;
(d) to send a command to enter downlink mode, to all other wireless communication stations except for the wireless communication station whose wireless communication signal is forwarded in step (c).

2. A communication system comprising:
a Distributed Antenna System (DAS) network comprising one or more Access Point Units (APUs) and two or more Station Units (STUs);
wherein a first STU (240) is to receive, from a first wireless communication station (250), an uplink communication comprising a first signal (270) being at a first frequency, transmitted over a first Wi-Fi connection, and carrying one or more packets;
wherein the first STU (240) is to convert the first signal (270) to a second signal (271) being at a second, different, frequency; wherein the first STU (240) is to convey said one or more packets towards an APU (220), via said second signal (271) being at said second, different, frequency;
wherein the APU (220) is (a) to receive from said first STU (240) said second signal (271) carrying said one or more packets, and (b) to transmit a third signal (273) carrying said one or more packets and being at said first frequency, towards an Access Point (AP), and (c) to also perform a loopback transmission and by transmitting a fourth signal (272) to at least a second STU (241), wherein the loopback transmission comprises a transmission of a prevention signal indicating to a second wireless communication station (251) to refrain from transmitting towards its respective second STU (241);
wherein the second STU (251) is to receive said fourth signal (272) from the APU (220), and to convert said fourth signal (272) into a fifth signal (274), and to transmit said fifth signal (274) over a second Wi-Fi connection to said second wireless communication station (251), wherein said fifth signal comprises said prevention signal indicating to said second wireless communication station (251) to refrain from transmitting towards its respective second STU (241),
wherein the APU (220) is
(a) to detect an uplink collision between (I) a first wireless signal generated at the first wireless communication station (250), and (II) a second wireless signal generated at the second wireless communication station (251);
(b) to transmit the first wireless signal to a first radio element of said Access Point (AP), and to transmit the second wireless signal to a second radio element of said Access Point (AP), wherein the first radio element and the second radio element have the same MAC address;

(c) to receive a first ACK response from the first radio element of said Access Point (AP), and to receive a second ACK response from the second radio element of said Access Point (AP);
(d) to forward the first ACK response to the first wireless communication station (250), and
to forward the second ACK response to the second wireless communication station (251).

* * * * *